US008448881B2

(12) United States Patent
Young et al.

(10) Patent No.: US 8,448,881 B2

(45) Date of Patent: May 28, 2013

(54) FUEL INJECTOR

(75) Inventors: Kenneth James Young, Derby (GB); Yann Courbariaux, Verdun (CA); Michel Houde, Quebec (CA); Daniel Haggerty, Clive, IA (US); Philip Buelow, West Des Moines, IA (US)

(73) Assignee: Rolls-Royce Power Engineering PLC, Derby (GB)

( * ) Notice: Subject to any disclaimer, the term of this patent is extended or adjusted under 35 U.S.C. 154(b) by 602 days.

(21) Appl. No.: 11/974,392

(22) Filed: Oct. 12, 2007

(65) Prior Publication Data

US 2008/0210782 A1 Sep. 4, 2008

Related U.S. Application Data

(60) Provisional application No. 60/851,460, filed on Oct. 13, 2006.

(51) Int. Cl.

*B05B 1/34* (2006.01)
*B05B 1/26* (2006.01)
*F02K 9/28* (2006.01)
*F02G 3/00* (2006.01)

(52) U.S. Cl.

USPC ............ 239/498; 239/463; 239/489; 60/258; 60/748

(58) Field of Classification Search

USPC ............... 239/5, 11, 463, 483, 498, 461, 464, 239/466, 467, 468, 471, 472, 475, 489, 497; 60/258, 740, 748, 742

See application file for complete search history.

(56) References Cited

U.S. PATENT DOCUMENTS

| | | | | |
|---|---|---|---|---|
| 4,188,782 | A | 2/1980 | Smith et al. | |
| 4,408,722 | A * | 10/1983 | Frelund | 239/453 |
| 4,487,369 | A * | 12/1984 | Du Rocher | 239/488 |
| 4,811,905 | A | 3/1989 | Ishikawa et al. | |
| 4,971,254 | A * | 11/1990 | Daly et al. | 239/489 |
| 5,072,885 | A * | 12/1991 | Hans et al. | 239/466 |
| 5,090,625 | A * | 2/1992 | Davis | 239/453 |
| 5,207,384 | A * | 5/1993 | Horsting | 239/463 |
| 5,220,787 | A | 6/1993 | Bulman | |
| 5,390,498 | A | 2/1995 | Sulkin | |
| 5,431,346 | A | 7/1995 | Sinaisky | |
| 5,607,106 | A * | 3/1997 | Bentz et al. | 239/88 |
| 5,799,872 | A * | 9/1998 | Nesbitt et al. | 239/8 |
| 6,027,331 | A * | 2/2000 | Dobbeling et al. | 431/182 |
| 6,349,885 | B1 * | 2/2002 | Parrish | 239/5 |
| 7,188,662 | B2 | 3/2007 | Brewer et al. | |
| 2006/0218926 | A1 | 10/2006 | Prociw et al. | |
| 2007/0068164 | A1 | 3/2007 | Hernandez et al. | |

* cited by examiner

*Primary Examiner* — Len Tran
*Assistant Examiner* — Justin Jonaitis
(74) *Attorney, Agent, or Firm* — Krieg DeVault LLP

(57) ABSTRACT

An apparatus and method for minimizing and/or preventing thermal degradation of fuel in a fuel injector is disclosed. The body of the injector includes a fuel gallery with a contoured scarf formed therein. The scarf is configured to minimize and/or prevent fuel recirculation thus reducing the likelihood that fuel will dwell in an area long enough to sufficient to cause the degradation of the fuel.

22 Claims, 4 Drawing Sheets

FUEL INJECTOR

PRIORITY CLAIM

This application claims the benefit of U.S. Provisional Application No. 60/851,460, filed Oct. 13, 2006, which is hereby incorporated by reference in its entirety.

FIELD OF THE INVENTION

The present invention relates to fuel injectors, and more particularly to reducing fuel flow stagnation regions in fuel injectors.

BACKGROUND

Fuel injectors are used to deliver fuel into a combustor wherein the fuel is burned to produce power in an engine. A variety of engines use fuel injectors including internal combustion engines, both spark ignited and diesel, gas turbine engines, pulse detonation engines, wave rotors, and the like. When hydrocarbon based fuels are exposed to high temperatures over a period of time, the fuel will thermally degrade or pyrolyse to form tars, lacquers, and coke. The degraded fuel will reduce the performance of the fuel injector and can eventually clog at least a portion of the fuel passages within the injector. To prevent thermal degradation, fuel injectors must be thermally isolated and/or have fuel flow velocities that are high enough to prevent excessive heat build up in the fuel. The present invention contemplates a novel and unobvious way to minimize thermal degradation of fuel in a fuel injector.

SUMMARY

One embodiment of the present invention is a unique fuel injector. Other embodiments include apparatuses, systems, devices, hardware, methods, and combinations for altering a fuel flow within a fuel injector. Further embodiments, forms, features, aspects, benefits, and advantages of the present application shall become apparent from the description and figures provided herewith.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
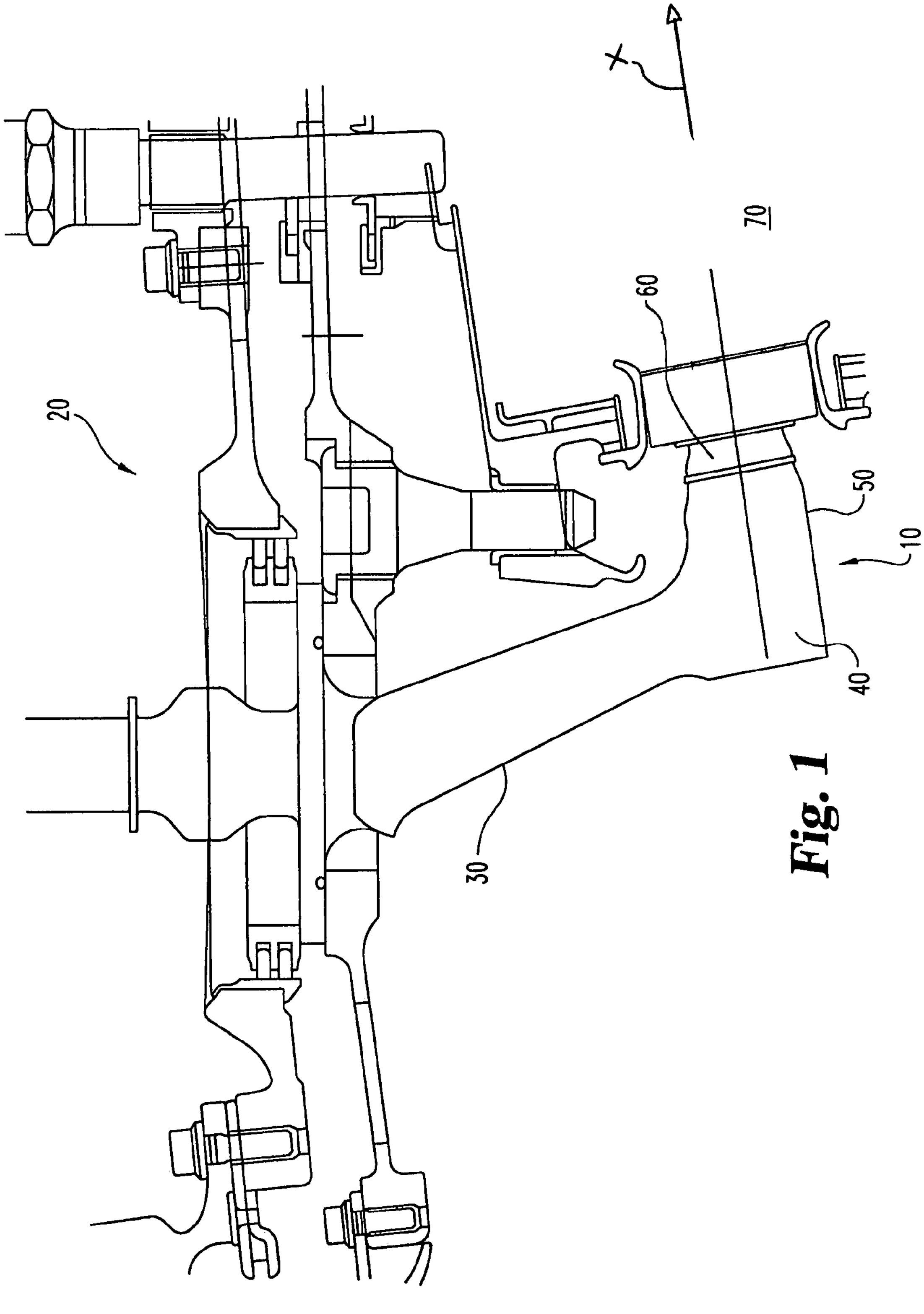
FIG. 1 is a cross sectional view of a fuel injector and engine support structure.

For purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

The inventions disclosed herein include means for reducing thermal degradation of fuel in fuel injectors used in engines powered by hydrocarbon based fuels. Fuel injectors typically operate in a hot environment because they are positioned adjacent combustion chambers. If the fuel does not move through the fuel injector at relatively high velocities then the heat load will cause the fuel to degrade and eventually can clog the injector nozzle. In one scenario where the fuel actually re-circulates in a stagnation region of the injector, it will only be a matter of time before the fuel injector needs to be replaced. The inventors have found that stagnation regions form most often in injectors when a fuel delivery manifold is not in line with the longitudinal flow axis of the injector. As the fuel turns from the entry angle defined by the fuel manifold toward the longitudinal flow axis of the fuel injector, a stagnation region can form at the opposing or distal side of the injector relative to the fuel inlet location.

Referring to FIG. 1, a fuel injector 10 is illustrated in one embodiment of the invention. The fuel injector 10 can be held in position by an engine support structure 20 which will not be described in detail, because the particular design configuration of the surrounding support structure 20 does not affect the present invention. A fuel inlet manifold 30 can extend from the engine support structure 20 to hold the fuel injector 10 in a desired position. The fuel inlet manifold 30 is operable for delivering fuel from a source (not shown) to an injector body 40 of the fuel injector 10. The fuel injector body 40 generally extends along an extension axis denoted as X in FIG. 1. The fuel injector 10 includes an outer housing 50 and an exit end 60 of the injector connected thereto. Although not illustrated in detail, a combustor or combustion chamber 70 is typically positioned downstream of the fuel injector 10.

Figure 2:
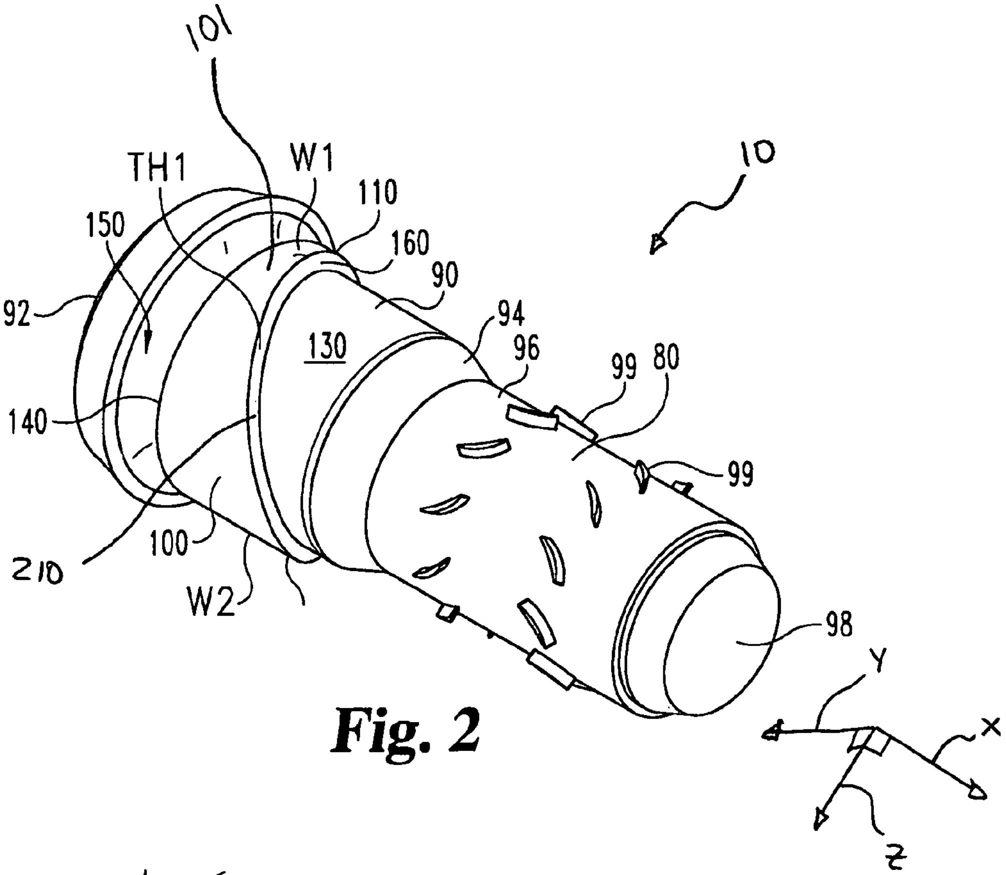
FIG. 2 is a perspective view of the fuel injector in FIG. 1 with an outer housing removed.

Referring to FIG. 2, the fuel injector 10 is shown with the outer housing 50 removed thereby depicting internal features of the injector 10. With the outer housing 50 removed, an inner housing 80 can be viewed. The inner housing 80 is shown with a substantially cylindrical shape extending along an extension axis denoted as X in FIG. 2, which corresponds to axis X in FIG. 1. Two additional axes are depicted in FIG. 2 and denoted as Z and Y to provide an arbitrary but useful reference system for some of the discussion below. In addition to the cylindrical shape depicted in FIG. 2, the inner housing 80 can have other geometric configurations as would be known to those skilled in the art.

While detailed understanding of the fuel injector 10 is not required to fully appreciate the disclosed invention, a few of the internal features can be observed. The inner housing 80 can have a relatively large diameter 90 at a first end 92 and can neck down through a transition 94 to a relatively smaller diameter 96 at a second end 98. The transition 94 in the illustrated embodiment is shown having a circumferentially and axially symmetric neck down between transition ends 212*a* and 212*b*, but in other embodiments may have an irregular and/or non-constant neck down. For example, the transition end 212*b* may vary in a sinusoidal pattern over the circumferential distance of transition 94, to set forth just one nonlimiting example. The inner housing 80 has a plurality of guide vanes 99 operable to control the flow of fuel, air and/or air/fuel mixture within the injector body 40. Guide vanes 99, however, may not be used in some embodiments.

A scarf 100 is positioned adjacent the first end 92 of the fuel injector 10. The scarf 100 advantageously facilitates fuel flow movement from the first end 92 to the second end 98 of the fuel injector 10 as will be described hereinbelow. The scarf 100 includes a wall 101 having a first width W1 adjacent a first side 110 which is proximate the fuel inlet manifold 30 (best seen in FIG. 3) and a second larger width W2 located at an opposing or distal side 120 from the first side 110. In some applications the first side 110 may be referred to as a top side and the distal side 120 may be referred to as a bottom side. However, it will be understood that the terms "top" and "bottom" do not necessarily refer to the relative location of the fuel injector within the confines of a combustor. The terms are merely meant to aid in distinguishing various features of the instant application.

The scarf 100 has an annular wall 210 of thickness TH1 that extends between an outer surface 130 of the inner housing 80 to the inner surface (not shown) of the outer housing 50 (also not shown). The annular wall 210 has a substantially constant thickness TH1 in the illustrated embodiment around the circumference of the fuel gallery 170, but in other embodiments may have a varying thickness TH1 corresponding to changes in the relative distance between the inner surface of the outer housing 50 and the outer surface 130 of the inner housing 80. The annular wall 210 forms a fuel flow boundary in the illustrated embodiment as will be described hereinbelow.

A first edge 140 of the scarf 100 is positioned adjacent an end wall 150 at the first end 92 of the fuel injector 10. A second edge 160 of the scarf 100 extends from the first edge 140 at the first width W1 proximate the first side 110 down to the distal side 120 at the second width W2 as defined from the end wall 150. The scarf 100 can be symmetrical about a vertical axis or can vary three dimensionally along any major axis of the injector 10. The second edge 160 can be substantially linear and/or can be arcuate depending on the particular injector design criteria relative to radial and axial fuel velocity requirements.

In alternate embodiments, the scarf 100 can take other forms such as having a thickness TH1 less that the distance between the inner and outer housings 80 and 50, respectively. Furthermore, the scarf may not necessarily extend 360 degrees around the inner housing 80. The scarf 100 may instead be positioned locally in the stagnation region as a plug or a deflector to prevent fuel from entering the stagnation region. In one form the function of the scarf 100 is to facilitate transition of the fuel flow direction from any angle relative to the longitudinal axis of the injector 10 to a direction substantially parallel to the longitudinal axis of the injector 10.

The scarf may be integrally formed with the body 40 of the injector 10 or may be formed as a separate piece. In one non limiting embodiment, the scarf 100 is formed integrally with the end wall 150 of the injector 10. In another embodiment, the scarf is attached to the body of the injector via welding, brazing, or mechanical means. In still another embodiment, the scarf is formed integrally with the body of the injector via casting, forging, and/or machine work. In yet another embodiment, the scarf is formed from different material than the material used to form the body of the injector.

Figure 3:
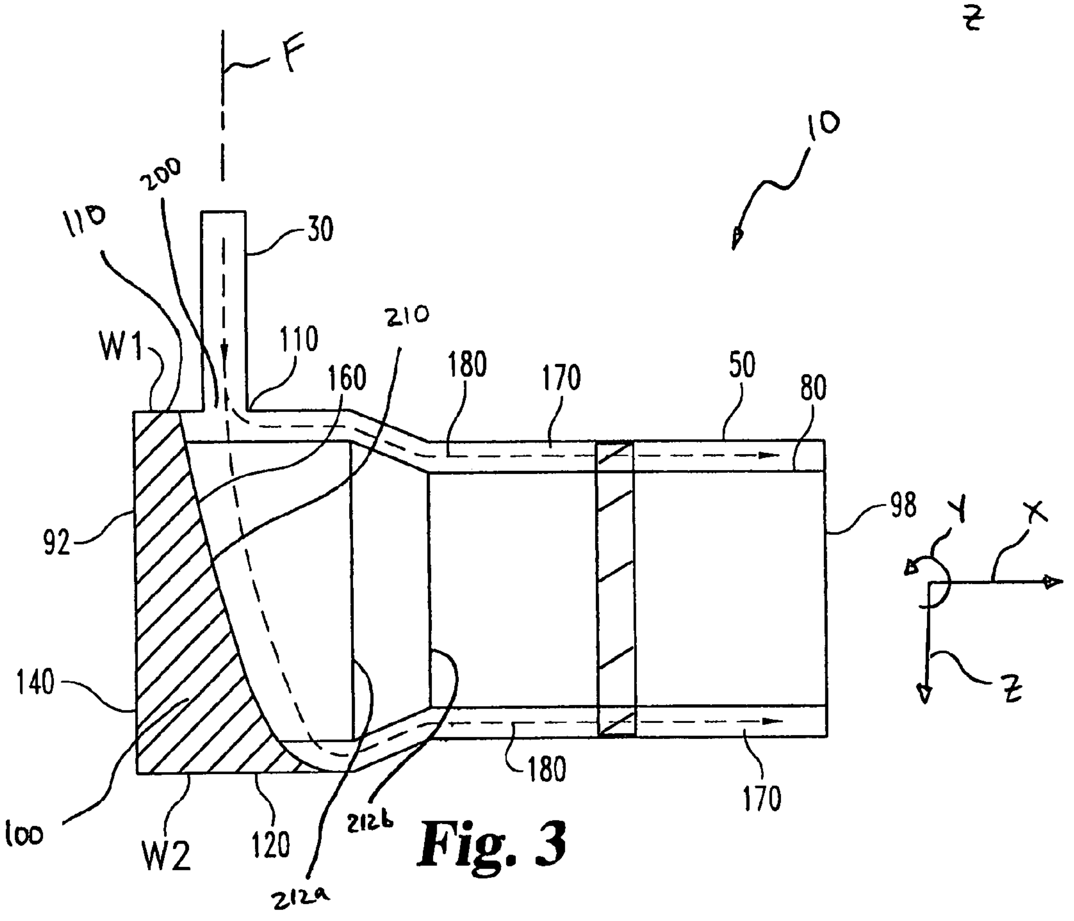
FIG. 3 is a cross-sectional schematic of the fuel injector of FIG. 1 showing fuel streamlines.

Referring to FIG. 3, a cross-sectional view of one embodiment of the injector 10 schematically illustrates fuel streamlines flowing from the fuel inlet manifold 30, through inlet 200, and then in to a fuel gallery 170. The fuel inlet manifold 30 is shown having an axis of extension F generally aligned with the Z-axis such that fuel enters inlet 200 along a path generally aligned with the Z-axis. In some embodiments, however, the fuel inlet manifold 30 may not be aligned with the Z-axis.

The annular wall 210 extends in a curvilinear manner from the first side 110 to the distal side 120, as seen in the side view of FIG. 3 along the Y axis. The curvilinear shape of annular wall 210 may also be referred to as a variably arcuate shape. In some embodiments, the annular wall 210 may extend in a straight line or may take on any other shape configured to prevent and/or minimize a stagnation region.

The fuel gallery 170, located between the inner housing 80 and the outer housing 50, permits the fuel to enter the injector 10 and circumferentially follow along the second edge 160 of the scarf 100. In one embodiment, the fuel gallery 170 can entirely encompass the inner housing 80. The fuel gallery 170 operates to direct fuel from the first end 92 toward the second end 98 of the injector 10. Without the scarf 100, a fuel gallery 170 may have a naturally occurring stagnation region located at or near the distal side 120 opposite from the fuel inlet manifold 30. If not for a scarf 100 positioned in or adjacent the natural stagnation region, a fuel recirculation zone would form and cause the re-circulating fuel to thermally degrade due to the prolonged exposure to a heat load. Therefore, it will be appreciated that the scarf 100 is positioned and oriented in the illustrated embodiment to minimize or prevent a stagnation region from forming. If the fuel manifold 30 and fuel flow rates and conditions change in other embodiments then different shapes, positions, and orientations of scarf 100 can be used.

The fuel injector 10 can be formed of material or combinations of material designed to withstand the temperatures and pressures required under engine operating conditions. Typically the majority of the material selected would be from a metal such as stainless steel or nickel based alloys. Alternatively the material could be at least partially formed of ceramic and/or composites. It should be appreciated, that the scarf 100 may be formed from a different material than used in the body 40 of the injector.

Figure 4:
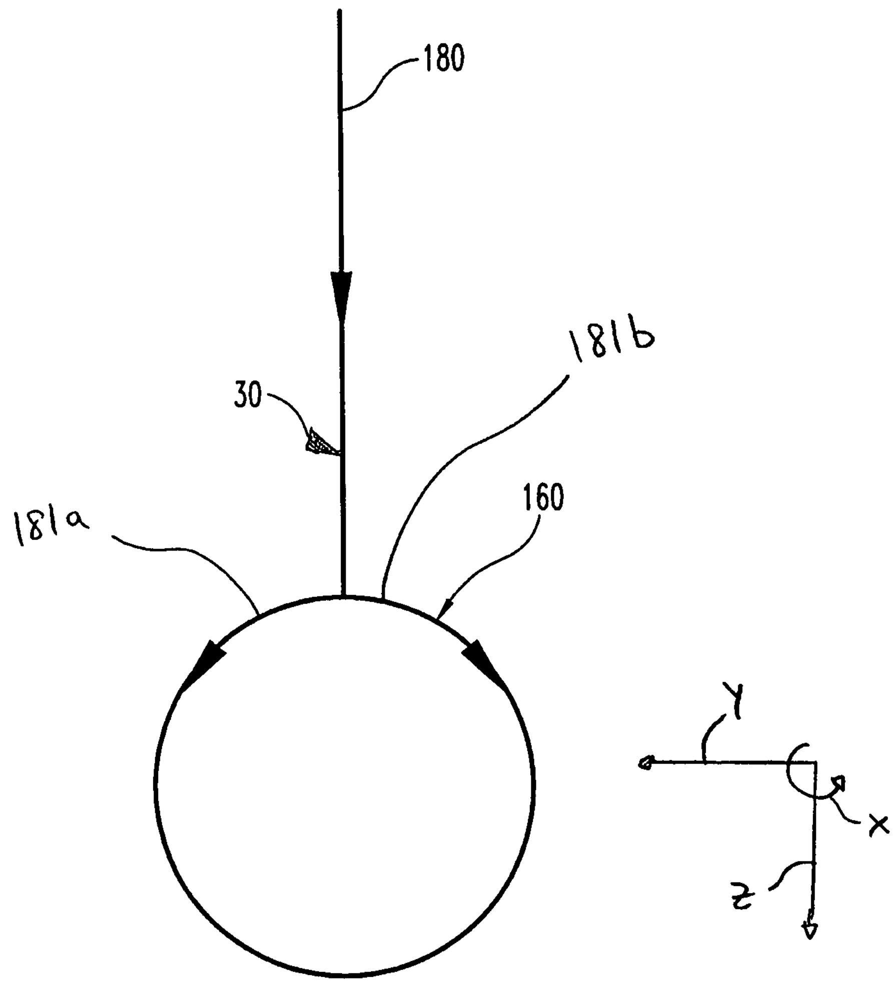
FIG. 4 is an end view schematic of fuel streamlines as they enter the injector and flow around the fuel gallery.

Turning now to FIG. 4 and with continuing reference to FIG. 3 above, a front view of a fuel flow path is depicted with a view along the X axis. In operation, the fuel is delivered from the fuel inlet manifold 30 to the fuel gallery 170. The fuel streamlines 180 then flow circumferentially around the fuel gallery 170 along the second edge 160 of the scarf 100. After filling the fuel gallery 170 circumferentially near the first end 92 of the injector 10, the fuel will be forced to flow toward the second end 98 and exit through the exit end 60 (see FIG. 1) and mix with combustion air in the combustor 70. At the distal side 120 of the injector body 40 the fuel streamlines 180 are urged to flow in a longitudinal axial direction relative to the injector body 40 due to the location and design shape of the scarf 100. Thus, scarf 100 effectively prevents and/or minimizes flow recirculation in the area of the distal side 120 formed when streamlines 181*a* and 181*b* coalesce relative to a configuration without scarf 100. In this manner, thermal degradation of the fuel due to recirculation is eliminated. It will be understood, however, that scarf 100 may be used anywhere a fuel flow stagnation region develops, whether caused by the manner described above or other mechanisms. For example, scarf 100 could be used in an adverse pressure gradient region to minimize and/or prevent the formation of separated flow.

Figure 5:
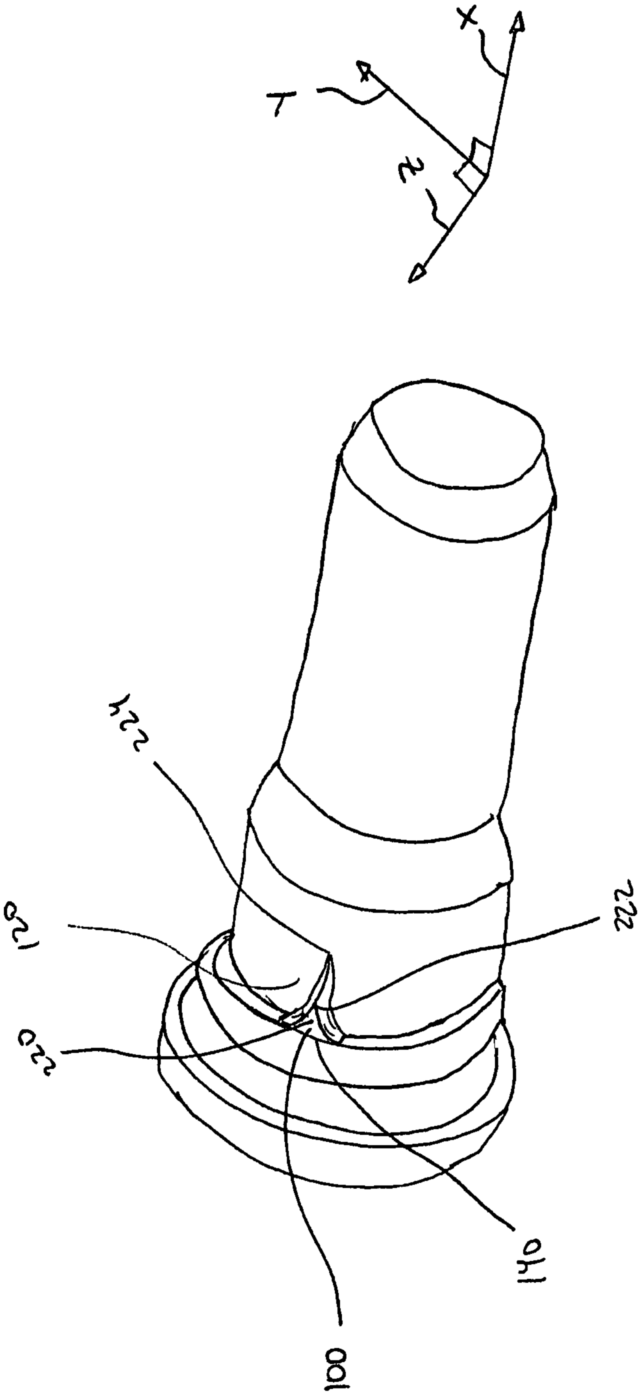
FIG. 5 is a perspective view of the fuel injector of FIG. 1 with an outer housing removed.

FIG. 5 depicts another embodiment of the instant application. Fuel injector 10 has been rotated about the X axis to better show a view along the Z axis. Scarf 100 has been added to outer surface 130 and is located proximate distal side 120. Depending on the flow properties and relative location of fuel inlet manifold 30, scarf 100 may be placed at other locations within fuel gallery 170. Scarf 100 has a shark's tooth shape with rounded plateau 220 that is configured to engage the inner surface (not shown) of the outer housing 50 (also not shown). The apex 222 of the plateau 220 tapers down to the outer surface 130 of the inner housing 80 at a vertex 224. Scarf

100 serves as a plug or deflector in distal side 120 to prevent and/or minimize a fuel recirculation region from developing.

One aspect of the invention contemplates a fuel injector comprising: an injector body having first and second ends connected to a fuel inlet manifold; an inner housing; an outer housing spaced apart from the inner housing to form a fuel gallery within the injector body; and a scarf positioned within the fuel gallery proximate the first end of the injector body, the scarf is adapted to urge the fuel to flow generally in a longitudinally axial direction relative to the injector body, the scarf operable to prevent a fuel stagnation region from forming in the fuel gallery. Another aspect of the present invention provides that the scarf comprises: a wall having a first edge spaced axially apart from a second edge defined by a first width proximate the fuel inlet and a second width proximate a side opposite of the fuel inlet, wherein the second width is greater than the first width. Yet another aspect of the present invention provides that the second edge of the scarf is substantially linear. Yet another aspect of the present invention provides that the second edge of the scarf is variably arcuate. Yet another aspect of the present invention provides that the scarf has a thickness that substantially extends from an inner wall of the outer housing to an outer wall of the inner housing. Yet another aspect of the present invention provides that the inner and outer housings are substantially circular in cross-section and substantially concentric relative to one another. Yet another aspect of the present invention provides that the scarf is attached to the body of the injector via welding, brazing, or mechanical means. Yet another aspect of the present invention provides that the scarf is formed integrally with the body of the injector via casting, forging, and/or machine work. Yet another aspect of the present invention provides that the scarf is formed from different material than the material used to form the body of the injector.

Another aspect of the present invention contemplates a fuel injector comprising: a fuel gallery formed internal to the injector connected to a fuel inlet; and a scarf positioned in the fuel gallery such that the fuel is prevented from re-circulating and forced to traverse axially along a longitudinal axis of the fuel injector. Yet another aspect of the present invention contemplates that the scarf comprises: a first side having a first width proximate to a fuel inlet extending to a second side having a second width larger than the first width, the second side positioned at a distal side of the fuel gallery relative to the fuel inlet. Yet another aspect of the present invention contemplates that the scarf extends substantially linearly between the first and second sides. Yet another aspect of the present invention contemplates that the scarf extends in an arcuate path between the first and second sides. Yet another aspect of the present invention contemplates that the scarf extends less than 360 degrees around an inner housing of the fuel injector. Yet another aspect of the present invention contemplates an injector further comprising: a pair of spaced apart walls with substantially circular cross-sections forming the fuel gallery. Yet another aspect of the present invention contemplates that the scarf has a thickness substantially equal to the distance between the spaced apart walls. Yet another aspect of the present invention contemplates that the scarf is attached to the injector via welding, brazing, or mechanical means. Yet another aspect of the present invention contemplates that the scarf is formed integrally with the injector via casting, forging, and/or machine work.

Another aspect of the present invention contemplates a method of preventing thermal degradation of fuel in a fuel injector comprising: delivering fuel to a fuel gallery defined between an inner wall and an outer wall of a fuel injector body; and preventing fuel from entering a stagnation region of the fuel gallery. Yet another aspect of the present invention contemplates the preventing step comprises: forming a scarf in the stagnation region of the fuel gallery to urge the fuel generally along a longitudinal axis of the injector. Yet another aspect of the present invention contemplates that the preventing step comprises: turning the fuel flow direction from a defined angle of entry into the fuel.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. A fuel injector comprising:

an injector body disposed along an axis and having first and second ends and a fuel inlet proximate the first end configured to receive a fuel flow in substantially a first flow direction;

an annular fuel gallery disposed internal to the injector body and located between the first and second ends, the annular fuel gallery having opposing walls that form an annular space and within which a fuel substantially fills the annular space during operation when fuel is flowed through the annular fuel gallery; and a scarf positioned within the fuel gallery proximate the first end of the injector body, the scarf is configured to assist turning the fuel flow from the first flow direction to a second flow direction oriented along an axis, the scarf having a nonsymmetric shape about the axis, wherein the scarf is operable to discourage a fuel stagnation region from forming in the fuel gallery.

2. The injector of claim 1, wherein the second flow direction is a longitudinally axial direction relative to the injector body.

3. The injector of claim 1, wherein the scarf includes:

a first edge positioned proximate the first end of the injector body;

a second edge spaced axially from the first edge and having a top side and a bottom side; and wherein the top side is spaced a first width from the first edge, and the bottom side is spaced a second width from the first side edge.

4. The injector of claim 1, wherein an annular wall extends in a straight line between the top end and bottom end.

5. The injector of claim 1, wherein an annular wall is curved as it extends between the top end and bottom end.

6. The injector of claim 1, which further includes an inner housing and an outer housing, wherein the scarf is positioned between the inner housing and the outer housing.

7. The injector of claim 6, wherein the scarf has a thickness that substantially extends from an inner wall of the outer housing to an outer wall of the inner housing.

8. The injector of claim 6, wherein the inner and outer housings are substantially circular in cross-section and substantially concentric relative to one another.

9. The injector of claim 1, which further includes a transition positioned between the scarf and the second end.

10. The injector of claim 1, wherein the scarf is attached to the body of the injector via welding, brazing, or mechanical means.

11. The injector of claim 1, wherein the scarf is formed integrally with the body of the injector via casting, forging, and/or machine work.

12. The injector of claim 1, wherein the scarf is formed from different material than the material used to form the body of the injector.

13. A fuel injector comprising:

a fuel manifold extending along an arm axis;

an injector body in fluid communication with the fuel manifold and having an injector body axis, the injector body having an inlet to receive fuel flow at a first angle formed between the arm axis and the injector body axis; and a scarf positioned within the injector body to urge the fuel flow in turning from the first angle to a second angle, and preventing the fuel flow from re-circulating, the scarf having a circumferentially variable flow surface around at least a portion of the injector body axis.

14. The injector of claim 13, which further includes an inner housing and an outer housing and an annular fuel gallery formed between the inner housing and the outer housing, wherein the scarf is positioned in the fuel gallery.

15. The injector of claim 13, wherein the scarf extends less than 360 degrees around the annular fuel gallery.

16. The injector of claim 13, wherein the scarf is positioned proximate to a naturally occurring stagnation region in the fuel gallery.

17. The injector of claim 14, wherein the scarf has a thickness substantially equal to the distance between the inner housing and outer housing.

18. A fueling device comprising:

a fuel injector having an internal first flow direction and an internal second flow direction; and means for minimizing formation of stagnation zones within an injector body when a fuel flow is turned from the internal first flow direction to the internal second flow direction the means located in an annular shaped flow space.

19. A method of preventing thermal degradation of fuel in a fuel injector comprising:

delivering fuel from a fuel injector arm in a first fuel flow direction to a fuel gallery disposed in a fuel injector head, the fuel gallery defined between an inner wall and an outer wall of a fuel injector body;

preventing fuel from entering a stagnation region of the fuel gallery as the fuel is turned from the first flow direction to a second fuel flow direction;

flowing the fuel through an annular flow space having an annular scarf along the second flow direction; and wherein the preventing includes flowing the fuel along an axially and circumferentially varying transition surface.

20. The method of claim 19, which further includes flowing a fuel at varying flow rates.

21. A method of making a fuel injector comprising:

constructing a fuel injector having a first internal flow direction and a second internal flow direction; and forming a scarf within an annular fuel space in which a fuel is substantially present throughout the entirety of the annular fuel space and the scarf is nonsymmetric about an axis in the fuel injector to prevent and/or minimize a fuel stagnation region.

22. The method of claim 21, which further includes locating the scarf in an annular fuel gallery.

* * * * *